United States Patent Office 2,981,771
Patented Apr. 25, 1961

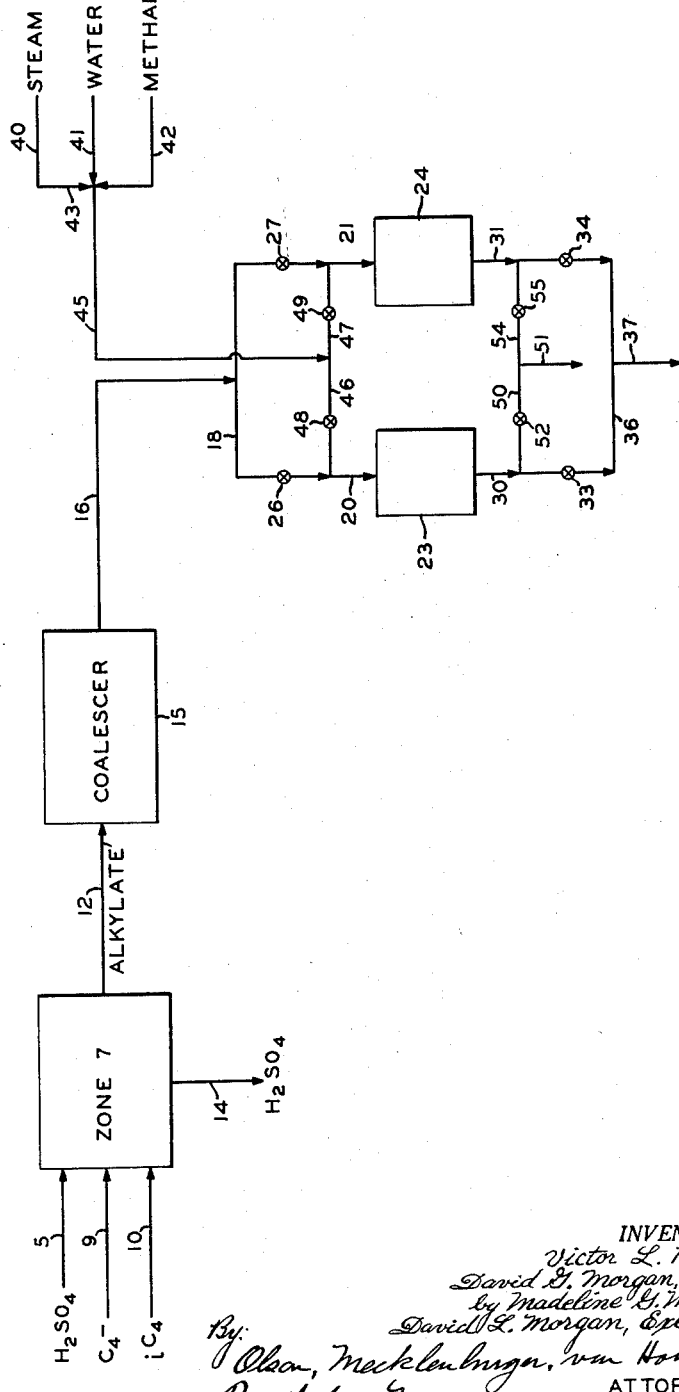

2,981,771

REGENERATION OF SPENT ADSORBENT

Victor L. Brant, Tulsa, Okla., David G. Morgan, deceased, late of Tulsa, Okla., by Madeleine G. Morgan and David L. Morgan, executors, Tulsa, Okla.; said Victor L. Brant and David G. Morgan, assignors to D-X Sunray Oil Company, Tulsa, Okla., a corporation of Delaware Original application Dec. 22, 1955, Ser. No. 554,842. Divided and this application July 24, 1959, Ser. No. 835,812

9 Claims. (Cl. 260—683.62)

This invention relates to an improved method for the treatment of a hydrocarbon contaminated with sulfuric acid, esters of sulfuric acid and related sulfur-bearing compounds, and, more particularly, it pertains to the treatment of an alkylation product derived from the reaction of isoparaffins and olefins in the presence of sulfuric acid to eliminate substantially the sulfur bearing contaminants, in particular dialkyl sulfate contaminant. This application is a division of application Serial No. 554,842, filed December 22, 1955, in the names of David D. Hartley, Victor L. Brant, David G. Morgan and Robert W. Provine.

In the alkylation of isoparaffins and olefins by means of sulfuric acid, it is found that the alkylate product, following the separation thereof from the sulfuric acid, is contaminated with sulfuric acid and other sulfur-bearing contaminants, such as, for example, mono and dialkyl sulfates. The total reaction product is usually subjected to a separation treatment for the recovery of alkylate product from the unreacted isoparaffin material. Therefore, it is essential, in order to minimize corrosion of the equipment used for separation, that the sulfur-bearing compounds and sulfuric acid be eliminated substantially. In the past, the treatment of alkylate for the removal of contaminants has been effected by caustic treatment. It was found, however, that the caustic treatment is not entirely satisfactory for the reason that the non-acidic sulfur-bearing compounds, such as the dialkyl sulfates, are not readily reactable with the caustic material under the conditions employed. As a result, these compounds in the alkylate decomposed under the conditions of separation and formed corrosive products which caused operating difficulty in, for example, the reboiler section of the alkylation fractionation tower. For this reason, it is important that the contaminants in the alkylate product, notably the esters of sulfuric acid, be removed substantially, otherwise, serious corrosion is experienced in the recovery equipment. It is the purpose of this invention to provide an improved method by which the difficulties mentioned hereinabove are substantially overcome.

It is an object of this invention to provide an improved method for the treatment of a hydrocarbon oil containing sulfuric acid, esters of sulfuric acid and related sulfur-bearing compounds for substantial removal of the contaminant.

Another object of this invention is to treat an alkylate product derived from sulfuric acid alkylation for the removal of sulfuric acid, esters of sulfuric acid and related sulfur-bearing compounds therefrom.

Other objects and advantages of this invention will become apparent from the following description and explanation thereof.

It is contemplated by means of this invention to treat a product derived from the alkylation of an isoparaffin with an olefin by means of sulfuric acid contaminated with sulfuric acid, esters of sulfuric acid and related sulfur-bearing compounds by the method which comprises contacting the said oil with an adsorbent under such conditions that the hydrocarbon is in liquid phase and substantially all of the sulfur-bearing compounds are adsorbed by the alumina.

In another aspect of this invention, when the hydrocarbon oil containing sulfuric acid, esters of sulfuric acid and related sulfur-bearing compounds is contaminated with a substantial amount of sulfuric acid, it is initially treated for the removal of at least about 70 percent of the sulfuric acid contaminant and thereafter the treated hydrocarbon is contacted with an adsorbent under such conditions that the hydrocarbon is in liquid phase and substantially all of the sulfuric acid, esters of sulfuric acid and related sulfur-bearing compounds are adsorbed.

The present invention is particularly applicable for the treatment of a product derived from the alkylation of an isoparaffin with an olefin by means of sulfuric acid, which is contaminated with esters of sulfuric acid, more particularly dialkyl sulfate ester. This alkylation reaction is well known to those skilled in the art and it involves, for example, the reaction of an isoparaffin, e.g., isobutane, isopentane, isohexane, etc., with an olefin, e.g., propylene, butylene, amylene, etc., in the presence of sulfuric acid. The isoparaffin to olefin molar ratio is about 6 to about 1000:1 and the sulfuric acid employed is about 50 to about 0.5 pounds of sulfuric acid per pound of olefin. The reaction is effected at a temperature of about 0° to about 100° F. and at a pressure of about 0 to about 25 p.s.i.g. The sulfuric acid is immiscible with the hydrocarbon material however, a portion thereof remains dispersed in the alkylation product along with the mono and dialkyl esters. Generally, the alkylation product contains between about 1.0 and about 0 percent by weight of sulfuric acid, more usually between about 0.1 and about 0.01 percent; between about 0.01 and about 0 percent by weight of sulfur in other sufur-bearing compounds, more usually between about 0.005 and about 0.001 percent. The treatment with an adsorbent serves not only to remove sulfur-bearing contaminant in an economical and efficient manner, but also, it improves quite unexpectedly the lead susceptibility or response of the alkylate much beyond what is normally expected.

The adsorbent materials which are suitable for carrying out this invention include absorbent aluminas, such as activated alumina and inorganic silicates, such as aluminum silicate, magnesium silicate or mixtures thereof. These materials do not provide equivalent results, however, and the invention is preferably carried out by treating contaminated hydrocarbons with alumina. Accordingly the following discussion is directed primarily to the use of this type of material. This, however, is not to be construed as limiting the scope of the invention.

In general, the alumina material to be used contains not more than about 10 percent by weight of water, and, more particularly, it contains about 6 to about 8 percent by weight of water, based on the total material. Specifically, the use of bauxite as the adsorptive alumina is unusually effective. Bauxites, in general, contain about 40 to about 80 percent by weight of alumina and appreciable amounts of water ranging in amounts from about 15 to about 35 percent by weight. For the purpose of this invention, the water concentration is lowered to the desired level by roasting or calcining the alumina or bauxite at an elevated temperature between about 500 and 1250° F. It is found that bauxite has exceptional properties for the adsorption of sulfuric acid, esters of sulfuric acid and related sulfur-bearing compounds from the hydrocarbon alkylate and, in addition, it is successfully regenerated over appreciable periods of time without substantial loss of activity for the intended purpose. In general, the adsorption of the sulfate material from the hydrocarbon alkylate is effected at a temperature of about 35° F. to about 350° F., preferably about 35° F. to about 130° F.; a pressure of about 0 to about 500 p.s.i.g.; and a residence time of about 0.5 to about 28 minutes, preferably about 3 to about 9 minutes. In general, the quantity of oil being treated relative to the alumina or bauxite employed for the purpose is defined in terms of the weight space velocity, that is, the pounds of oil being supplied to the treating zone per hour per pound of bauxite or alumina which is present therein. The weight space velocity is about 0.5 to about 30, preferably about 3 to about 10.

While sulfuric acid is immiscible with hydrocarbon oils, nevertheless, in the alkylation reaction it tends to emulsify or become dispersed throughout the hydrocarbon oil and, for this reason, it is found that some sulfuric acid will pass to the treating zone containing the alumina material. The passage of appreciable quantities of sulfuric acid to the treating zone can have serious effects on the length of operation by shortening the effective life of the alumina. One method of prolonging the operating cycle is to employ bauxite or alumina containing a minimum concentration of water, that is, in the amount specified hereinabove. In another aspect of this invention, the hydrocarbon oil to be treated is preliminarily subjected to a separation treatment for the removal of at least about 70 percent of the sulfuric acid contained in the hydrocarbon feed. More usually, the separation treatment results in the removal of 75 to about 95 percent of the sulfuric acid.

An effective method for the removal of sulfuric acid is by means of a coalescer. The coalescing means may be varied in nature, however, in general, it may comprise a mat or a body of glass wool or steel turnings, or any material which will furnish or supply surface area to the hydrocarbon oil passing therethrough. The coalescing means are well known to those skilled in the art and, for this reason, it is not believed necessary to define their construction in detail. In general, the separation of sulfuric acid from the hydrocarbon oil by means of coalescers is effected at a temperature of about 0° F. to about 250° F.; a pressure of about 0 to about 500 p.s.i.g. and at linear flow rate of about 0.01 to about 10 feet per second or below the velocity at which mixing occurs due to impingement. As previously indicated, the removal of sulfuric acid reduces proportionately the tendency for the sulfuric acid to shorten the effective life of the alumina.

After the alumina or bauxite has been used for an appreciable period of time and large quantities of sulfur-bearing contaminants are adsorbed thereon, it becomes necessary to regenerate the alumina. In this respect, it should be noted that bauxite is unusually effective for the treatment of hydrocarbon oils in accordance with this invention for the reason that it can be regenerated repeatedly and still retain to a substantial extent its original adsorptive activity. Since the treatment of the hydrocarbon oil is effected under liquid phase conditions, the first step in the regeneration procedure is to empty the treating zone of all liquid material. After the treating zone has been emptied of hydrocarbon oil, the alumina or bauxite is washed with water at a temperature of about 40° to about 210° F. and for a period of about 15 minutes to about 20 hours. Water is a polar material which is preferentially adsorbed on the alumina or bauxite, consequently, it serves to displace the sulfur-bearing contaminants which are adsorbed on the alumina. The desorption of contaminants by means of water is accelerated as the temperature is increased, and for that reason, it is preferred that the water treatment be effected in a series of steps of increasing temperature. In this respect, the first phase or step is effected at a temperature between about 40° F. and 100° F. and for a period of about 15 minutes to about 10 hours. A low temperature is used in the first step in order to avoid undue temperature rises which may occur from wetting the alumina with water. The second step is effected at a temperature of about 100° F. to 210° F. and for a period of about 15 minutes to 10 hours. While two steps of washing with water have been given it should be understood that within each step, the temperature may be raised gradually or abruptly and the temperature at various stages of treatment may be varied in any manner desired, or the washing can be effected as a single step with the temperature being gradually raised. After the alumina or bauxite has been treated with water, and it is apparent from the effluent that a substantial part or all of the sulfur-bearing contaminants have been removed, the alumina is optionally treated with steam for the purpose of removing appreciable quantities of water therefrom and/or to assist in removing contaminants from the alumina. The steam treating step is effected at a temperature of about 220° F. to about 500° F. and for a period of about 0.5 to about 15 hours, more usually about 1 to about 10 hours. The steam treatment is conducted for a period sufficient to remove a substantial amount of water which is wetting the alumina and to desorb more sulfur-bearing compounds, if present. Following the steam treatment, the alumina or bauxite is treated with a gas at an elevated temperature of about 200° F. to about 1000° F., more usually about 300° F. to about 500° F. and for a period of about 1 to about 30 hours for the purpose of drying or desorbing substantial quantities of water. The gas used may be any inert gas capable of replacing the water present on the alumina, such as, for example, flue gas, nitrogen, natural gas and, in general, gaseous hydrocarbons containing not more than 2 carbon atoms. After the alumina or bauxite has been dried by means of the gas, it is then optionally cooled by passing the gas at a lower temperature therethrough for a period of about 0.5 to about 10 hours. The temperature of the gas falls within the same range which is used for the treatment of hydrocarbon oil with the alumina, that is, in general, a temperature of about 35° F. to about 120° F. After the alumina or bauxite has been cooled by means of the gas, it is ready for the treatment of a contaminated hydrocarbon alkylate.

While the preceding discussion has been limited to a consideration of treatment of a hydrocarbon alkylate material, it is not intended that the particular aspect of the invention relating to regeneration of the spent alumina be restricted in scope thereby. This portion of the invention is intended to include the regeneration of alumina which has become spent through the treatment of sulfur contaminated hydrocarbon oils in general. In this respect, the hydrocarbon can be one which has been previously treated with sulfuric acid, such as, for example, gasoline, naphtha, kerosene, gas oil, lubricating oil, etc. The method of treatment of the hydrocarbon fraction by means of sulfuric acid is well known to those skilled in the art, and, therefore, it is not necessary to describe herein the conditions of treatment.

In order to provide a better understanding of this invention, reference will be had to the accompanying drawing which contains an illustration of the present invention.

In the drawing, sulfuric acid, having a titrable acidity of 95 percent, is fed from source 5 at the rate of 30,000 pounds per hour, and this material is charged to an alkylation reactor shown schematically as zone 7. A butylene feed material is fed to the alkylation zone 7 by means of line 9 at the rate of 5000 barrels per day. Similarly, the isobutane feed is fed from source 10 at the rate of 12,000 barrels per day. In the alkylation zone, the temperature is maintained at about 35° F. and at a pressure of about 5 p.s.i.g. As a result, an alkylate is produced containing a hydrocarbon of 8 carbon atoms and which is useful as aviation fuel or for blending to produce motor fuel. The alkylate is discharged from the alkylation zone by means of line 12; whereas the sulfuric acid which is separated therefrom is discharged from the alkylation zone by means of line 14. The alkylate product contains about 0.02 percent by weight of emulsified sulfuric acid and about 0.002 percent by weight of sulfur in other sulfur-bearing compounds, principally esters of sulfuric acid. The alkylate material is charged to a coalescer shown schematically as 15 and which contains glass wool having an approximate fiber diameter of about 0.00025 inch. The coalescer is maintained at a temperature of about 40° F. and at a pressure of about 175 p.s.i.g. The alkylate passes through the coalescer at a superficial linear velocity of about 0.12 feet per second.

As a result of the operating conditions in the coalescer, approximately 80 percent of the sulfuric acid originally contained therein is removed. The treated alkylate is discharged from the coalescer by means of line 16 and it flows to a header 18. The header 18 is connected to lines 20 and 21 which are, in turn, connected to the top of treaters 23 and 24, respectively. Each of these treaters contains 8000 pounds of bauxite, occupying a volume of about 140 cubic feet. The bauxite has a mesh size of about 20/60 and it contains in its original dehydrated condition about 6 percent water. The entry lines 20 and 21 which are connected to the top of treaters 23 and 24 contain valves 26 and 27, respectively. Treaters 23 and 24 are operated alternately such that while one of them is being regenerated, the other is being used for the adsorption of sulfur-bearing contaminants from the alkylate. In this example, treater 23 is being used for the removal of contaminants from the alkylate product. Accordingly, valve 26 is in an open position, whereas valve 27 is closed. Further, the treated alkylate is passed from the bottom of the treaters 23 and 24 by means of lines 30 and 31, respectively. These lines also contain valves 33 and 34. In operation, valve 34 is closed, whereas valve 33 is open, consequently, the treated alkylate passes into header 36 before being discharged from the system by means of line 37. The quantity of alkylate being charged to treater 23 provides a weight space velocity of about 6. Further, the alkylate entering treater 23 contains about 0.004 percent by weight of sulfuric acid and about 0.002 percent sulfur in other sulfur bearing contaminants. The temperature in treater 23 is about 40° F. and the pressure is about 175 p.s.i.g. Under these conditions, the alkylate product is in a liquid phase, and the alkylate leaving treater 23 contains 0.0001 percent sulfur in sulfur bearing contaminants, thus showing the unusual effectiveness of bauxite for this purpose.

For the purpose of regeneration, steam, water and methane are supplied from lines 40, 41 and 42 and these, in turn, are connected to a header 43. One of the regeneration materials flows from supply header 43 to line 45, which in turn divides into lines 46 and 47. Lines 46 and 47 contain valves 48 and 49, respectively. Since treater 24 is being regenerated, valve 48 is closed, whereas valve 49 is in an open position. The regeneration fluid is discharged from the bottom of treaters 23 and 24 by means of lines 30 and 31, respectively. The regeneration fluid is passed from line 30 to line 50 and thence, it can be discharged from the system by means of line 51. Line 50 contains valve 52. On the other hand, regeneration fluid can pass from treater 24 to line 31 and, in turn, line 31 is connected to line 54 containing valve 55. In the present example, valve 52 in line 50 is in a closed position, whereas valve 55 in line 54 is open, and, therefore, the regeneration fluid from treater 24 is discharged from the system by means of line 51. The regeneration of bauxite in treater 24 is effected in accordance with the following schedule:

| Steps | Rate | Temp., °F. | Time, Hrs. |
|---|---|---|---|
| 1. Emptying Contactor _____ g.p.h__ | 420 | 45 | 2.5 |
| 2. Water Washing _____ g.p.h__ | 1,500 | 80 | 1.5 |
| 3. Water Washing _____ g.p.h__ | 1,500 | 100 | 0.5 |
| 4. Water Washing _____ g.p.h__ | 1,500 | 125 | 0.5 |
| 5. Water Washing _____ g.p.h__ | 1,500 | 150 | 0.5 |
| 6. Water Washing _____ g.p.h__ | 3,000 | 175 | 0.5 |
| 7. Water Washing _____ g.p.h__ | 3,000 | 200 | 0.5 |
| 8. Water Washing _____ g.p.h__ | 5,000 | 200 | 1.0 |
| 9. Steam Heating _____ #/hr. max__ | 5,000 | 350 | 6.0 |
| 10. Natural Gas Drying _____ s.c.f.h__ | 25,000 | 350 | [1] 12.0 to 14.0 |
| 11. Natural Gas Cooling _____ s.c.f.h__ | 25,000 | 80 | 5.0 |

[1] Dry 2.0 hours after bauxite reaches temperature of about 290° F.

Having thus provided a description of this invention, it should be understood that no undue limitations or restrictions are to be imposed by reason thereof, but that the scope of the invention is defined by the appended claims.

We claim:

1. In a process for the alkylation of an isoparaffin with an olefin in the presence of sulfuric acid in which the resulting alkylate product is passed through alumina for the removal of sulfur-containing contaminants, the improvements comprising regenerating alumina spent by adsorbing said contaminants by contacting the same with water at a temperature of about 40° F. to about 210° F. for a period of about 15 minutes to about 20 hours, treating the washed alumina with a steam at a temperature of about 220° F. to about 500° F. for about .5 to 15 hours, and treating the steam-treated alumina with an inert gas at a temperature of about 200° F. to about 1000° F. for a period of about 1 to 30 hours.

2. In a process for the alkylation of an isoparaffin with an olefin in the presence of sulfuric acid in which the resulting alkylate product is passed through alumina for the removal of sulfur-containing contaminants, the improvement comprising regenerating alumina spent by adsorbing said contaminants by contacting the same with water at a temperature between about 40° F. to 210° F. until the effluent water passing from such alumina is clear, treating the washed alumina with steam at a temperature of about 220° F. to about 500° F. for about 1 to 10 hours and treating the steam-treated alumina with an inert gas at a temperature of about 300° F. to about 500° F. for a period of about 1 to 30 hours.

3. In a process for the alkylation of $C_4$ to $C_8$ isoparaffins with $C_3$ to $C_5$ olefins in the presence of sulfuric acid catalyst in an alkylation zone in which the alkylate product is contaminated with sulfur-bearing compounds and in which said product is fractionated in a fractionating zone, the improvement which comprises separating the major portion of said sulfur-bearing compounds from said alkylate product by passing said alkylate product through a liquid phase coalescing zone at a temperature in the range of from about 0° F. to about 250° F., separating an alkylate product containing a minor amount of said sulfur contaminants from said coalescing zone and contacting the same with an adsorbent material under liquid phase conditions to remove substantially all of the sulfur-bearing compounds from said alkylate product by adsorption, recovering alkylate product substantially free of sulfur contaminants from said adsorption step, fractionating the last mentioned product in said fractionating zone at an elevated temperature, washing the adsorbent material with water at a temperature in the range of from about 40° F. to about 210° F., thereafter contacting the water-treated adsorbent material with steam at an elevated temperature in the range of from about 220° F. to about 500° F., drying said adsorbent material after said steam treating step by contacting the same with a gaseous hydrocarbon containing not more than about 2 carbon atoms per molecule at a temperature between about 200 and about 1000° F., cooling said adsorbent material and employing the cooled adsorbent material to adsorb additional sulfur-bearing compounds from alkylate product.

4. In a process for the alkylation of $C_4$ to $C_6$ isoparaffins with $C_3$ to $C_5$ olefins in the presence of a sulfuric acid catalyst in which an alkylate product contaminated with sulfur-bearing compounds is recovered from the alkylation zone and is contacted with an alumina adsorbent, the improved method of regenerating the alumina for reuse which comprises contacting said alumina with water to desorb substantially all of said sulfur-bearing compounds, contacting said water-treated alumina with steam at an elevated temperature of from about 220° F. to about 500° F., and drying siad steam-treated alumina by direct contact with a gaseous material selected from the group consisting of flue gas, nitrogen, natural gas, and gaseous hydrocarbons containing not more than 2 carbon atoms per molecule.

5. The method of claim 4 in which the alumina is bauxite.

6. In a process for the alkylation of $C_4$ to $C_6$ isoparaffins with $C_3$ to $C_5$ olefins in the presence of a sulfuric acid catalyst in which an alkylate product contaminated with sulfur-bearing compounds is recovered from the alkylation zone and is contacted with an adsorbent, the improved method of regenerating the adsorbent for reuse which comprises washing said adsorbent with water at a temperature between about 40° F. and about 210° F., contacting said water-washed adsorbent with steam at an elevated temperature of from about 220° F. to about 500° F., and thereafter drying the steam-treated adsorbent by direct contact with an inert gaseous material at a temperature between about 200° F. and about 1000° F. to reduce the water content of the adsorbent below about 10 percent by weight.

7. In a process for the alkylation of $C_4$ to $C_6$ isoparaffins with $C_3$ to $C_5$ olefins in the presence of a sulfuric acid catalyst in which an alkylate product contaminated with sulfur-bearing compounds is recovered from the alkylation zone and is contacted with a bauxite adsorbent, the improved method of regenerating the bauxite for reuse which comprises contacting said contaminated bauxite first with water at a temperature in the range of from about 40° F. to about 100° F., thereafter raising the temperature of the water wash to from about 100° F. to about 210° F., contacting the water washed bauxite with steam at a temperature of from about 200° F. to about 500° F., drying said steam-treated bauxite by direct contact with a gaseous material at a temperature in the range of from about 300° F. to about 500° F., and thereafter cooling said dried bauxite under conditions such that said bauxite contains less than 10 percent by weight of water.

8. In a process for the alkylation of an isoparaffin with an olefin in the presence of a sulfuric acid catalyst in which an alkylate product contaminated with sulfur-bearing compounds is recovered from the alkylation zone and is contacted with an adsorbent, the improved method of regenerating the adsorbent for reuse which comprises contacting said adsorbent with water to desorb substantially all of said sulfur-bearing compounds, contacting said water-treated adsorbent with steam at an elevated temperature of from about 220° F. to about 500° F., and drying said steam-treated adsorbent by direct contact with an inert gaseous material at a temperature between about 200° F. and 1000° F.

9. In a process for the alkylation of an isoparaffin with an olefin in the presence of a sulfuric acid catalyst in which an alkylate product contaminated with sulfur-bearing compounds is recovered from the alkylation zone and is contacted with an adsorbent, the improved method of regenerating the adsorbent for reuse which comprises contacting said adsorbent with water to desorb substantially all of said sulfur-bearing compounds, contacting said water-treated adsorbent with steam at an elevated temperature of from about 220° F. to about 500° F., and thereafter cooling said dried adsorbent under conditions such that said adsorbent contains less than 10% by weight of water.

References Cited in the file of this patent

UNITED STATES PATENTS

| | | |
|---|---|---|
| 1,868,581 | Miller | July 26, 1932 |
| 2,381,256 | Callaway | Aug. 7, 1945 |
| 2,393,154 | Franklin | Jan. 15, 1946 |
| 2,398,495 | D'Ouville et al. | Apr. 16, 1946 |
| 2,700,690 | Mottern | Jan. 25, 1955 |